(No Model.) 2 Sheets—Sheet 1.
J. H. GOULD.
FLEXIBLE PIPE COUPLING.
No. 381,008. Patented Apr. 10, 1888.
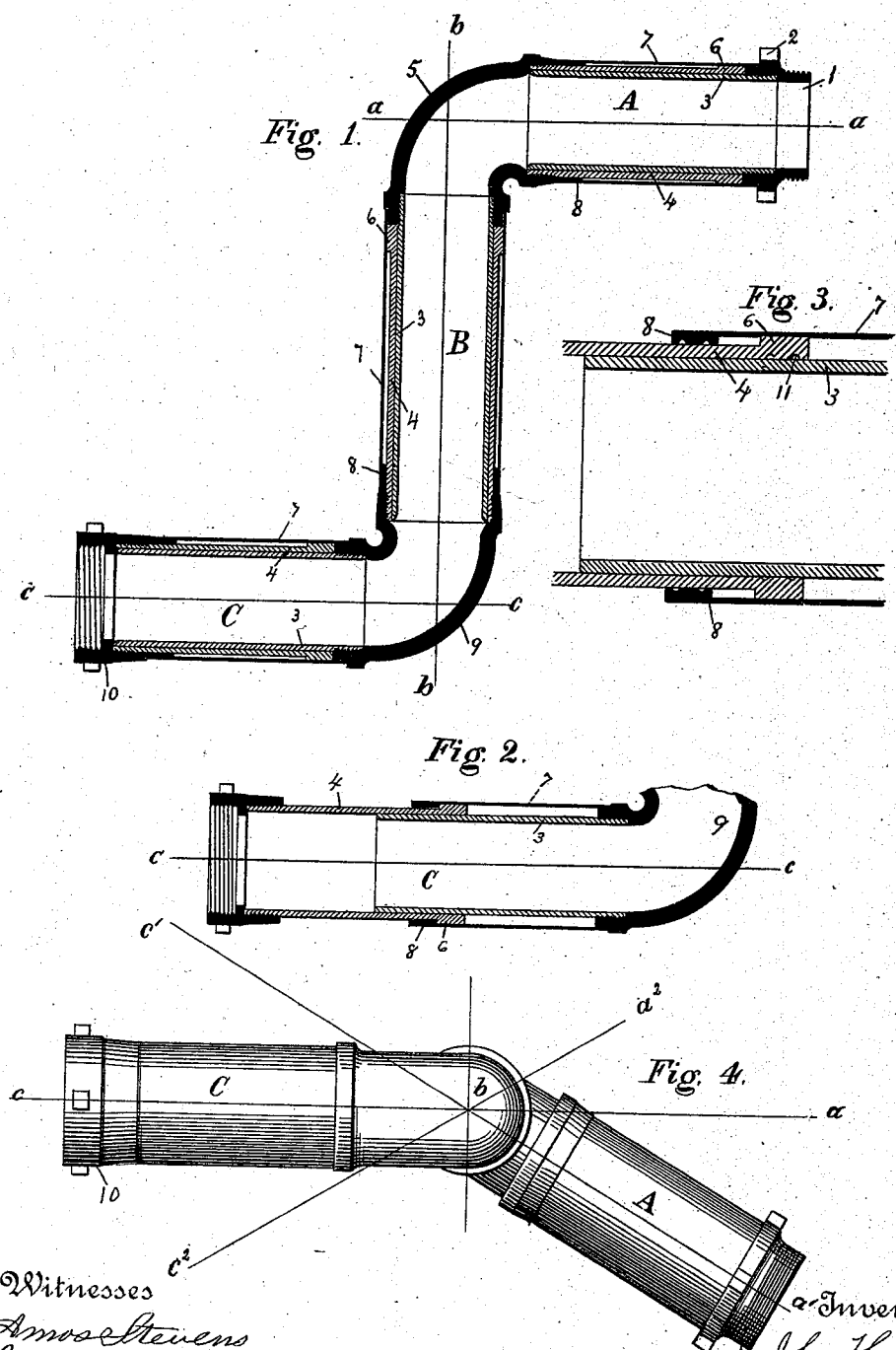
Witnesses
Amos Stevens
James J. Dougherty
Inventor
John H. Gould
By his Attorney Arthur L. Stevens (No Model.) 2 Sheets—Sheet 2.
J. H. GOULD.
FLEXIBLE PIPE COUPLING.
No. 381,008. Patented Apr. 10, 1888.
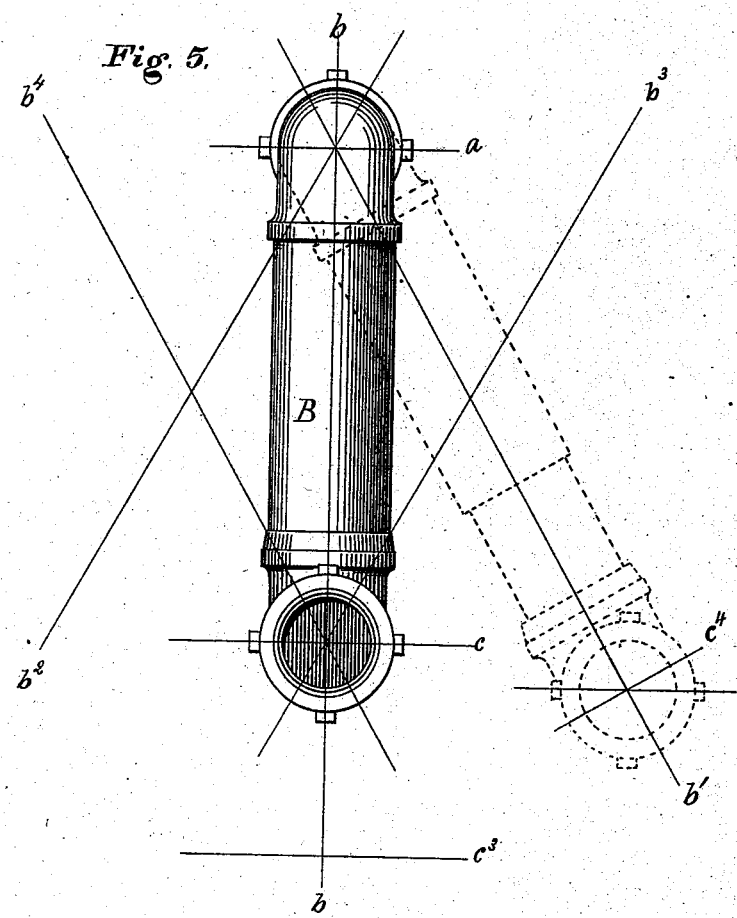
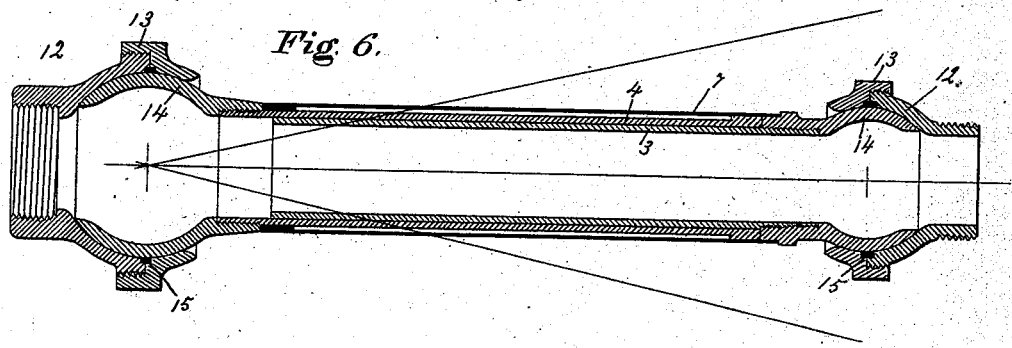
Witnesses
Amos Stevens
James J. Dougherty
Inventor
John H. Gould
By his Attorney Arthur L. Stevens

UNITED STATES PATENT OFFICE.

JOHN H. GOULD, OF PHILADELPHIA, PENNSYLVANIA.

FLEXIBLE PIPE-COUPLING.

SPECIFICATION forming part of Letters Patent No. 381,008, dated April 10, 1888.

Application filed January 7, 1888. Serial No. 260,027. (No model.)

*To all whom it may concern:*

Be it known that I, JOHN H. GOULD, a citizen of the United States, residing at Philadelphia, State of Pennsylvania, have invented certain Improvements in Flexible Pipe-Couplings, set forth in the following specification.

In making pipe-connections between two objects not in a fixed position relative to each other, or when the two pipes to be joined are not permanently in line, it becomes necessary to insert a flexible connecting-coupling so arranged as to adapt itself to the varying conditions imposed upon it. This is exemplified in the various air-brake and steam-heating systems applied to railway-trains, in which the common practice is to terminate each end of the various sections of pipe with a short piece of rubber hose provided with suitable metallic couplings. These pieces of flexible pipe between each car take up all oscillations and movement without destroying the continuity of the pipe. The unreliable nature of rubber usually employed for the purpose, its liability to injury, and its unsatisfactory behavior when subjected to extreme changes of temperature, and its unsuitability for places where impure water is used in water-heating systems, induced me to devise a flexible coupling entirely of metal to be capable of expanding, contracting, oscillating, or twisting in any required direction without destroying the continuity of the pipe. I attain my object in the manner illustrated in the accompanying drawings, and as set forth in this specification.

Figure 1 is a longitudinal section through the coupling with its various members contracted to their least length. Fig. 2 is a longitudinal section through one of its members extended to its greatest length. Fig. 3 is an enlarged sectional view of a portion of the coupling. Figs. 4 and 5 are views of the coupling, intended to illustrate how the various movements are obtained; and Fig. 6 is a longitudinal section through a modified form of the coupling.

Similar reference-signs are used throughout the several views.

Various modifications of my invention can be devised without changing my conception, which is to combine the various parts together, so that by a rocking or oscillating movement, or by a sliding movement, or by a combination of both movements, all requirements of a perfectly flexible coupling are attained.

The arrangement of the parts preferred and designed by me more particularly for use in a system of heating cars with hot water (but adapted equally well for other purposes) is that shown in Figs. 1 to 5 of the accompanying drawings. The coupling is in this case composed of three members, A, B, and C. Each of these members, being formed of telescoping tubes, is capable of expanding or contracting separately or simultaneously. The members A and C lie in parallel but different planes, while the member B lies in a plane vertical to the two other members. By this means I get three axes of rotation at right angles to each other. The tubes being free to rotate upon each other, it will be easily understood by reference to Fig. 4 that should the direction of the members A and C change laterally the coupling twists upon axes $b\ b$, allowing $c$ to move through the angle $c'$ or $c^2$, (more or less,) or $a$ through a greater or less angle, $a'$ or $a^2$, and should the distance between connections lengthen in the direction of $a\ c$, then either or both of the members A C may expand in the direction of their axes, as in Fig. 2.

Fig. 5 shows, first, how the vertical distance between $a$ and $c$ may lengthen by the member B expanding, as in Fig. 2, so that the center $c$ may be at $c^3$; secondly, how the coupling may twist upon the axis $a$ to accommodate a new lateral position of C, B swinging through a greater or less angle to $b'$ or $b^2$; thirdly, how the coupling may twist upon axis $c$ to accommodate a new lateral position of A, B swinging through a greater or less angle to $b^3$ or $b^4$; fourthly, how the member B may expand to accommodate a new vertical position of C at the same time that it occupies a new lateral position by extending to $c^4$.

The movements illustrated in Fig. 4 may of course be made simultaneous with those in Fig. 5, and it is believed that these changes are sufficient to meet all requirements of practice.

The member A consists of a union-piece, 1, threaded for the purpose of connection, and provided with lugs 2, to engage with a suitable wrench. Into this piece 1 is screwed or secured a tube, 3, of the same internal diameter as the pipes connected. Over this tube slides or telescopes the tube 4, which has one end screwed or secured to the elbow-piece 5, while the other end is enlarged or thickened to form a shoulder, 6. Secured to 1 is an outer covering-tube, 7, of such an internal diameter as to slide upon the enlarged portion of the tube 4, and is provided at its end with an internal shoulder, 8, to engage with the shoulder 6 and prevent the tubes being drawn apart. Member B is made in a similar way, having the inner tube, 3, and outer tube, 7, secured to elbow 5, while the tube 4 is secured to 9, which is an exact counterpart of 5, and the shoulders upon the tubes 4 and 7 serving the same purpose as they do in member A. Member C is similar to A, with the inner and outer tubes secured to 9, while the middle tube is secured to the connecting-nut 10, this nut having an internal thread, and being in fact the other part of the union of which 1 is a part and to which the leading pipes are attached.

Under ordinary circumstances no packing is required to keep the joint tight between the telescoping tubes. In cases where low-pressure steam is used a water-packing may be formed by turning grooves in the tubes, as shown in Fig. 3 at 11. Stuffing-boxes may be employed when necessary, but are not shown, as they do not form a part of my invention.

The modified form of coupling shown in Fig. 6 has a ball-and-socket joint at each end, formed of the threaded castings 12, having nuts 13, and the ball-castings 14. To one of these castings are secured the tubes 3 and 7, while to the other one is secured the tube 4, being the same arrangement of telescoping tubes to form an expansion member, as in the preceding case. Leakage through the ball-and-socket joint may be prevented by inserting packing at 15. This arrangement of the coupling allows an oscillation in every direction through a limited angle and an expansion or contraction in length, while the arrangement first described allows movement through a greater angle, and it is believed has sufficient freedom of movement to meet all requirements, the expanding feature being the same in both cases.

The advantage of the arrangement of tubes in my device is that it gives very large sliding surfaces to wear, has long joints to prevent leakage, the tubes cannot be pulled apart or disjointed, the covering tubes prevent escapement of "drip" and the entrance of dirt to the sliding surfaces.

The operation of my flexible coupling may be summarized as follows: The union-pieces 1 and 10, being secured to the connection, may oscillate, advance, or recede in the manner before described, the members of the coupling twisting upon or sliding in the direction of the axes of each member to accommodate each change in position of the connections, the telescoping tubes forming a sealed conduit of varying lengths. The arrangement shown in Fig. 6 accomplishes the same results by oscillating in the ball-and-socket joints and the sliding of the telescoping tubes.

Having described the advantages, construction, and operation of my invention, what I claim as new, and wish to secure by Letters Patent, is—

1. In a flexible pipe-coupling, the combination of a member provided with a union-piece, 1, having screwed or secured to it a tube, 3, and covering-tube 7, provided with a shoulder at 8, with a tube, 4, having shoulder 6, said tube being secured to an elbow-piece connecting another member placed at right angles to the first, substantially as herein described, and for the purpose specified.

2. In a flexible pipe-coupling having a member composed of a union-nut with tubes 3 and 7 secured thereto, said tube 7 having an inward-projecting shoulder, 8, and adapted to slide or telescope upon the shouldered tube 4, secured to an elbow connecting it with another member of the coupling, the combination of said member with a similar member placed with intersecting axes and so arranged as to be free to rotate and expand simultaneously, substantially as described, and for the purpose specified.

3. A coupling for pipes having a telescoping member composed of an inner tube, 3, and an outer tube, 7, provided with an inward-projecting shoulder, 8, and the tube 4, sliding between said tubes 3 and 7, and having shoulder 6 to engage with shoulder 8 for the purpose of preventing the separation of the tubes, said tubes 3 and 7 being secured to a suitable casting, as also is tube 4, said arrangement of tubes to be connected at each end with an oscillating member to give lateral flexibility, substantially as set forth.

JOHN H. GOULD. [L. S.]

Witnesses:
JAMES J. DOUGHERTY,
ARTHUR L. STEVENS.